US 6,366,902 B1

(12) United States Patent
Lyle et al.

(10) Patent No.: US 6,366,902 B1
(45) Date of Patent: Apr. 2, 2002

(54) USING AN EPOCH NUMBER TO OPTIMIZE ACCESS WITH ROWID COLUMNS AND DIRECT ROW ACCESS

(75) Inventors: Robert William Lyle, Morgan Hill; Jay A. Yothers, Gilroy, both of CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/322,312

(22) Filed: May 28, 1999

Related U.S. Application Data (60) Provisional application No. 60/101,729, filed on Sep. 24, 1998.

(51) Int. Cl.$^7$ .................. G06F 17/30; G06F 17/00
(52) U.S. Cl. ........................... 707/2; 707/203
(58) Field of Search .................. 707/1, 2, 203

(56) References Cited

U.S. PATENT DOCUMENTS

| | | | |
|---|---|---|---|
| 4,509,119 A | 4/1985 | Gumaer et al. ............. 364/200 |
| 4,949,388 A | 8/1990 | Bhaskaran ................... 382/10 |
| 4,961,134 A | 10/1990 | Crus et al. ................... 364/200 |
| 5,043,866 A | 8/1991 | Myre, Jr. et al. ........... 364/200 |
| 5,222,235 A | 6/1993 | Hintz et al. ................. 395/600 |
| 5,247,672 A | 9/1993 | Mohan ........................ 395/650 |
| 5,261,088 A | 11/1993 | Baird et al. .................. 395/600 |
| 5,291,583 A | 3/1994 | Bapat ......................... 395/500 |
| 5,295,188 A | 3/1994 | Wilson et al. ............... 380/38 |
| 5,388,255 A * | 2/1995 | Pytlik et al. ................. 395/600 |
| 5,396,623 A | 3/1995 | McCall et al. .............. 395/600 |
| 5,408,654 A | 4/1995 | Barry ......................... 395/600 |
| 5,416,915 A | 5/1995 | Mattson et al. ............. 395/425 |
| 5,418,921 A | 5/1995 | Cortney et al. ............. 395/425 |
| 5,418,940 A | 5/1995 | Mohan ........................ 395/575 |
| 5,435,004 A | 7/1995 | Cox et al. ................... 395/575 |
| 5,445,944 A | 8/1995 | Haderle et al. ............. 395/600 |
| 5,452,299 A | 9/1995 | Thessin et al. .............. 370/62 |
| 5,517,641 A | 5/1996 | Barry et al. ................. 395/600 |
| 5,566,329 A | 10/1996 | Gainer et al. ............... 395/600 |
| 5,579,499 A | 11/1996 | Fecteau et al. ............. 395/419 |
| 5,579,515 A | 11/1996 | Hintz et al. ................. 395/607 |
| 5,630,093 A | 5/1997 | Holzhammer et al. ...... 395/442 |
| 5,666,560 A | 9/1997 | Moertl et al. ............... 395/888 |
| 5,684,986 A | 11/1997 | Moertl et al. ............... 395/612 |
| 5,687,343 A | 11/1997 | Fecteau et al. ............. 395/412 |
| 5,721,915 A | 2/1998 | Sockut et al. ............... 395/616 |
| 5,727,197 A | 3/1998 | Burgess et al. ............. 395/602 |
| 5,732,402 A | 3/1998 | Lehman ...................... 707/205 |
| 5,737,601 A | 4/1998 | Jain et al. ................... 395/617 |
| 5,742,806 A | 4/1998 | Reiner et al. ............... 395/600 |
| 5,742,810 A | 4/1998 | Ng et al. ..................... 395/604 |
| 5,758,357 A | 5/1998 | Barry et al. ................. 707/202 |
| 5,761,667 A | 6/1998 | Koeppen ..................... 707/101 |
| 6,003,024 A * | 12/1999 | Bair et al. .................... 707/3 |
| 6,058,391 A * | 5/2000 | Gardner ....................... 707/4 |

FOREIGN PATENT DOCUMENTS

JP 8-167852 6/1996 ............. G06F/5/00

OTHER PUBLICATIONS

IBM Technical Disclosure Bulletin, "Method For Storing Large Objects in a Relational Database," vol. 35, No. 4A, pp. 72–75, Sep. 1992.

(List continued on next page.)

*Primary Examiner*—John Breene
*Assistant Examiner*—Susan Rayyan
(74) *Attorney, Agent, or Firm*—Sughrue Mion, PLLC (57) ABSTRACT

A method, apparatus, and article of manufacture for accessing a row in a database. In accordance with the present invention, the database is stored on a data storage device connected to a computer. An identification number is generated for a region, wherein the identification number associated with the region reflects row movement in the region. The identification number is updated when there is row movement in the region. When accessing a row in the region, whether to perform a direct row access is determined based on the identification number.

29 Claims, 5 Drawing Sheets

OTHER PUBLICATIONS

IBM Technical Disclosure Bulletin, "Reorganization Flags For Table Indexes," vol. 35, No. 5, pp. 156–157, Oct. 1992.

IBM Technical Disclosure Bulletin, "Technique to Allow DB2 Utilities and Commands to Run While SQL Applications Have a Table Space Locked," vol. 36, No. 09A, pp. 499–501, Sep. 1993.

IBM Technical Disclosure Bulletin, "Spanning Temporary Reorg Files," vol. 36, N. 06A, p. 159, Jun. 1993.

IBM Technical Disclosure Bulletin, "Segmented Relational Database Tables," vol. 38, No. 07, pp. 219–220, Jul. 1995.

IBM Technical Disclosure Bulletin, "Mapping a Relational Database to a Hierarchical File System," vol. 38, No. 10, pp. 309–311, Oct. 1995.

IBM Technical Disclosure Bulletin, "Fine Granularity Locking to Support High Data Availability in a Client/Server Database Management System," vol. 38, No. 02, pp. 143–145, Feb. 1995.

Joon Seek Kim, et al., "Mapping Parameter Estimation Using Integral Projections And Segmented Moving Objects in Object–Oriented Analysis–Synthesis Coding," Optical Engineering, vol. 35, No. 1, pp. 156–165, Jan. 1996 Considered Abstract.

MJ Carey, et al., "Object And File Management in The Exodus Extensible Database System," Proceedings of Very Large Data Bases. Twelfth International Conference on Very Large Data Bases, Kyoto, Japan, pp. 91–100, Aug. 25–28, 1986 Considered Abstract.

ML McAuliffe, et al., "Towards Effective and Efficient Free Space Management," 1996 ACM SIGMOD International Conference on Management of Data, Montreal, Quebec, Canada, Jun. 4–6, 1996 Considered Abstract.

C. Mohan, "Disk Read–Write Optimizations and Data Integrity in Transaction Using Write–Ahead Logging," Proceedings of the Eleventh International Conference on Data Engineering (Cat. No. 95CH35724), Taipei, Taiwan, Mar. 6–10, 1995 Considered Abstract.

Ki Sik Pang, et al., "An Efficient Recovery Scheme For Large Data in Multimedia DBMS," Journal of the Korea Information Science Society, vol. 22, No. 2, pp. 206–217, Feb. 1995 Considered Abstract.

C. Mohan, et al., "Algorithms For Flexible Space Management in Transaction Systems Supporting Fine–Granularity Locking," Advances in Database Technology—EDBT '94. 4th International Conference on Extending Database Technology, Cambridge, UK, Mar. 28–31, 1994 Considered Abstract.

Martin Marshall, "Time Warner Big on Oracle Objects. (Testing Oracle 8's Ability to Move Large Object Blocks)," (Company Operations), (Brief Article), CommunicationsWeek Issue: n676, pp. 1–3, Aug. 11, 1997.

Dr. Michael Stonebraker, "The Empire Strikes Back: DB2 Universal Database," http://www.oreview.com/9704side-.htm, pp. 1–7, 1997.

GH Sokut, "A Method For On–Line Reorganization of a Database," IBM Systems Journal, vol. 36, No. 3 pp. 411–436, 1997 Considered Abstract.

H. Koide, et al., "A New Memory Allocation Method For Shared Memory Multiprocessors With Large Virtual Address Space," Concurrency: Practice and Experience, vol. 9, No. 9, pp. 897–914, Sep. 1997 Considered Abstract.

* cited by examiner

USING AN EPOCH NUMBER TO OPTIMIZE ACCESS WITH ROWID COLUMNS AND DIRECT ROW ACCESS

CROSS-REFERENCE TO RELATED APPLICATIONS

This application claims the benefit of U.S. Provisional Application Ser. No. 60/101,729, entitled "IMPROVED DATABASE SYSTEM," filed on Sep. 24,1998, by Charles R. Bonner et al., which is incorporated by reference herein.

This application is related to the following co-pending and commonly-assigned patent applications:

application Ser. No. 09/321,675, entitled "A FAST TECHNIQUE FOR RECOVERING AN INDEX ON AN AUXILIARY TABLE," filed on same date herewith, by Robert W. Lyle et al.;

Application Ser. No. 09/322,292, entitled "STORING AN UNCOMPRESSED DATA LENGTH IN A LOB MAP TO SPEED SUBSTRING ACCESS WITHIN A LOB VALUE," filed on same date herewith, by Robert W. Lyle et al.;

application Ser. No. 09/322,287, entitled "A TECHNIQUE TO AVOID PROCESSING WELL CLUSTERED LOB'S DURING REORGANIZATION OF A LOB TABLE SPACE," filed on same date herewith, by Charles R. Bonner et al.;

application Ser. No. 09/322,317, entitled "AN OPTIMIZED TECHNIQUE FOR PREFETCHING LOB TABLE SPACE PAGES," filed on same date herewith, by Charles R. Bonner et al.;

application Ser. No. 09/322,286, entitled "A TECHNIQUE FOR CREATING A UNIQUE QUASI-RANDOM ROW IDENTIFIER," filed on same date herewith, by Robert W. Lyle et al.;

application Ser. No. 09/322,698, entitled "A TECHNIQUE FOR DETERMINING AN AGE OF AN OLDEST READING TRANSACTION WITHIN A DATABASE OBJECT," filed on same date herewith, by Robert W. Lyle et al.;

application Ser. No. 09/372,315, entitled "AN EFFICIENT TECHNIQUE TO DEFER LARGE OBJECT ACCESS WITH INTERMEDIATE RESULTS," filed on same date herewith, by Christine M. Lee et al.; and application Ser. No. 09/322,316, entitled "A TECHNIQUE FOR INPLACE REORGANIZATION OF A LOB TABLE SPACE," filed on same date herewith, by Charles R. Bonner et al.;

each of which is incorporated by reference herein.

BACKGROUND OF THE INVENTION

1. Field of the Invention

This invention relates in general to computer-implemented database systems, and, in particular, to accessing rows in a database.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. Tables are assigned to table spaces. A table space is associated with direct access storage devices (DASD), and, thus, tables, are stored on DASD, such as magnetic or optical disk drives for semi-permanent storage.

A table space can be a system managed space (e.g., an operating system file system) or a database managed space. Each table space is physically divided into equal units called pages. Each page, which may contain, for example, 4K bytes, holds one or more rows of a table and is the unit of input/output (I/O). The rows of a table are physically stored as records on a page. A record is always fully contained within a page and is limited by page size. As users move towards working with image data and other large data objects, storing data in conventional records becomes difficult.

An index is an ordered set of references to the records or rows in a database file or table. The index is used to access each record in the file using a key and a RID or row location. The RID provides the physical location of a row (i.e., the page number and location within the page of a particular row). A key is one of the fields of the record or one of the attributes of a row. The key ensures that a row is unique. Building an index for a large file can take a considerable amount of elapsed time. The process involves scanning all records in the file, extracting a key value and RID value from each of the records, sorting all of the key/RID values, and then building the index from the sorted key/RID values.

A row identifier ("ROWID") provides a unique identifier for each row in a table. When a DBMS reads a row identifier from a table, the row location (RID) is appended to the row identifier (ROWID), and thus, the row identifier contains information about the physical location of the row.

This RID enables users to write applications that directly access and operate on a row in a database. For example, if an application uses a RID in a data operation (e.g., SELECT, DELETE, or UPDATE), a DBMS can attempt to locate the row directly by using the RID appended to the row identifier (ROWID). To illustrate, assume that an application uses the row identifier (ROWID) in the following SELECT operation: SELECT FROM TABLE WHERE ROWID=:rowidval. The DBMS may locate the row directly by using the RID appended to the ROWID.

However, direct row access is not always feasible. In some instances, rows may move within a table space (e.g., after a reorganization). If a row has moved, the data operation (e.g., SELECT, UPDATE, and DELETE) must still return the qualifying row. In this case, the DBMS will perform a direct row access, determine that the row is not at the location indicated by the RID, and then, the DBMS will fall back to an alternative access path for finding the qualifying row.

Examples of alternative access paths include table space scans, index scans, and index look-ups. A table space scan involves reading a table space sequentially, which means that every row in the database table is read. An index scan involves scanning the entries of an index. An index look-up involves traversing an index tree to find an entry in an index. Typically, an index scan scans all of the entries of an index, while an index look-up uses the ordering of the index to find a desired entry. For example, if an index has a month column and a data column, and is ordered by the month column, then, to find data associated with a particular month, an index look-up is used to traverse the rows associated only with that month. To find data of a particular day, an index scan is used to scan each row of the index to identify desired days.

Performing the two steps (i.e., direct row access and an alternative access) can take a considerable amount of elapsed time, and hence, the expense of not finding rows is great. Therefore, there is a need in the art for an improved technique of accessing rows in a database.

SUMMARY OF THE INVENTION

To overcome the limitations in the prior art described above, and to overcome other limitations that will become apparent upon reading and understanding the present specification, the present invention discloses a method, apparatus, and article of manufacture for accessing a row in a database.

In accordance with the present invention, the database is stored on a data storage device connected to a computer. An identification number is generated for a region, wherein the identification number associated with the region reflects row movement in the region. The identification number is updated when there is row movement in the region. When accessing a row in the region, whether to perform a direct row access is determined based on the identification number.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
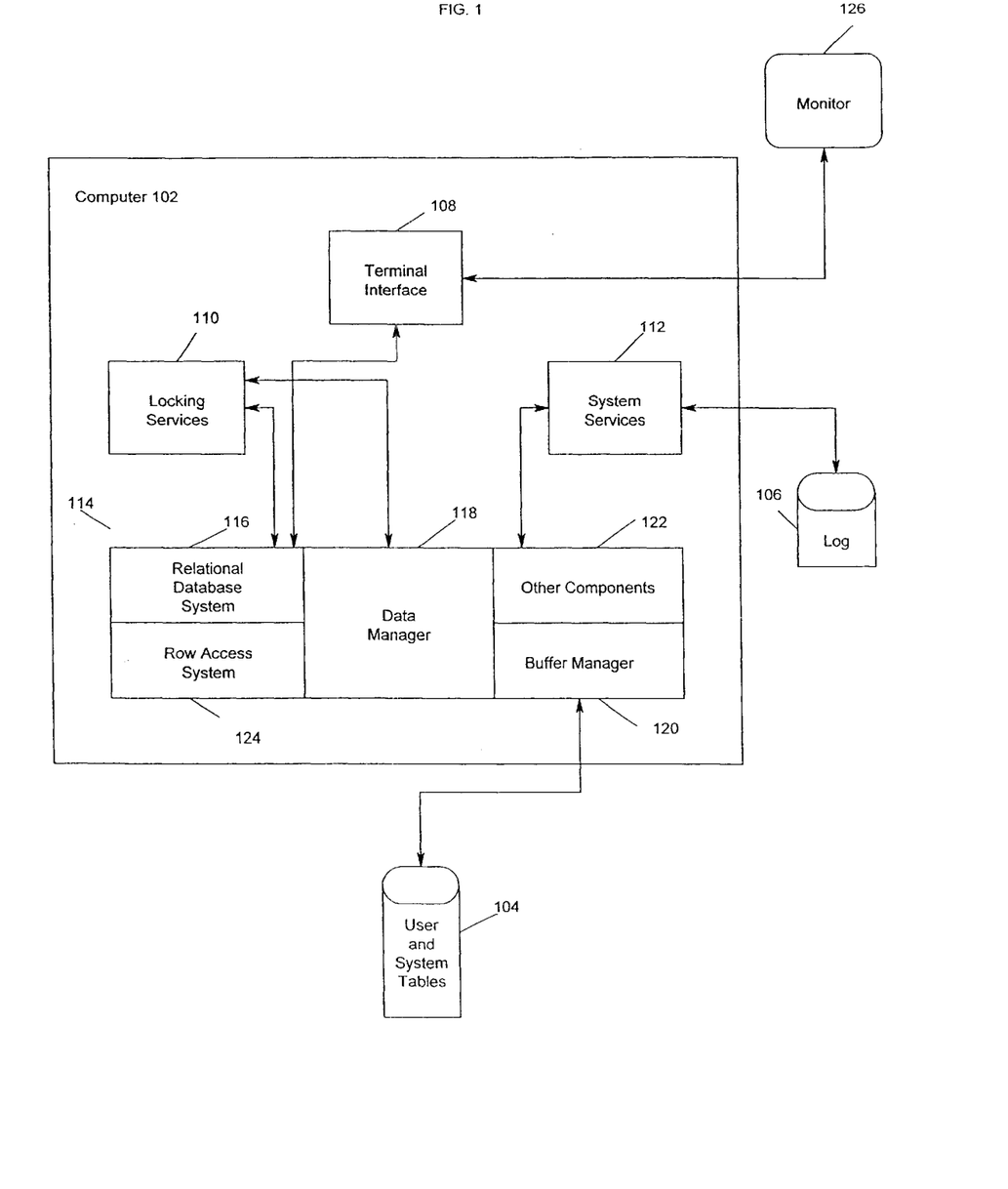
FIG. 1 is a block diagram illustrating an exemplary computer hardware environment that could be used in accordance with the present invention.

FIG. 1 is a block diagram illustrating an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the OS/390® operating system. Those skilled in the art will recognize, however, that the present invention has application program to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Row Access System 124, and other components 122 such as an SQL compiler/interpreter. These submodules support the functions of the SQL language, i.e. definition, access control, interpretation, compilation, database retrieval, and update of user and system data. The row access system 124 works in conjunction with the other submodules to optimize direct row access in a database table by determining when rows are moved.

The present invention is generally implemented using SQL statements executed under the control of the Database Services module 114. The Database Services module 114 retrieves or receives the SQL statements, wherein the SQL statements are generally stored in a text file on a data storage device, such as 104, or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more data storage devices, such as 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from data storage devices, such as 104, into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Optimizing Direct Row Access

The row access system 124 of the present invention optimizes row access by determining when rows are moved. Specifically, the row access system 124 associates a value or identification number, referred to as an "epoch number" with a region, such as a table space or with a partition of the region (e.g., if a table space is partitioned, the epoch number is associated with a partition). Then, when a row in that table space or partition is retrieved, the row access system 124 appends the epoch number associated with the table space, which is a new field, to the row identifier (ROWID) and row location (RID) of the row. The epoch number is used to determine when rows are moved. In particular, when rows are moved within the table space or partition, for example, by a reorganization, the epoch number stored for that table space or partition is updated.

That is, the row access system 124 increments the epoch number every time an operation that could result in row movement occurs. Before attempting to access a row, the row access system 124 uses the epoch number provided by a row access operation and the epoch number stored for a partition or table space to determine whether or not rows have moved within the table space or partition. If rows have not moved, the row access system 124 can directly access the row. If rows have moved, the row access system can use another access path (e.g., table scan, index scan, or index lookup), without attempting to directly access the row. This early determination improves the row access time because the row access system 124 does not expend time attempting both the direct row access and an alternative access (e.g., table scan or index lookup).

Figure 2:
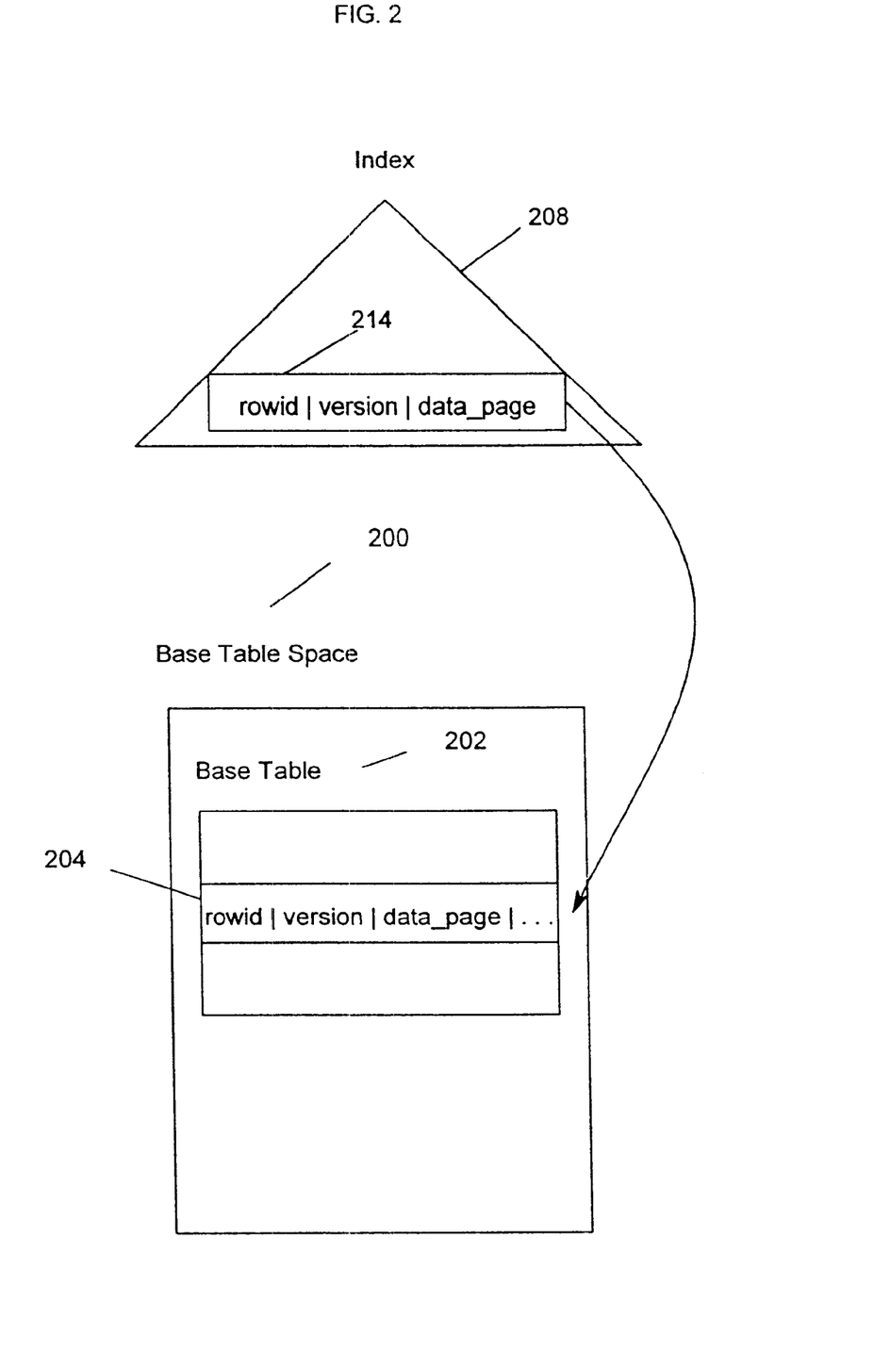
FIG. 2 is a block diagram illustrating an exemplary base table space.

FIG. 2 is a block diagram illustrating an exemplary base table space 200. A base table space 200 contains a base table 202. The base table 202 is a table definition that logically contains rows and columns of data. For example, row 204 contains columns for a row identifier ("rowid"), a version number ("version"), and other columns (indicated with the ellipses). An index 208 is created on the base table. The index 208 is used to quickly find a specific row in the table. In particular, the index 208 contains keys, such as key 214, which contains the row identifier, version number, and data page number containing that row. The key is used to index the base table 202.

Figure 3:
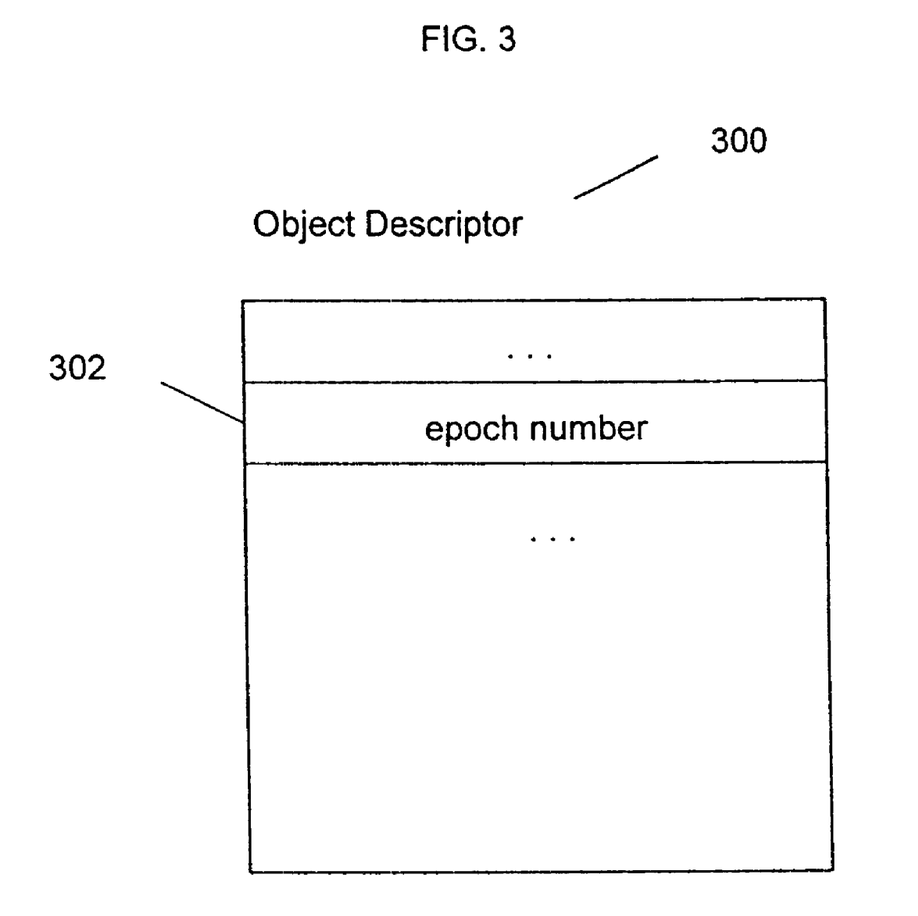
FIG. 3 is a block diagram illustrating an exemplary object descriptor.

FIG. 3 is a block diagram of an object descriptor 300. The object descriptor 300 (i.e., catalog) contains information about a table space. In particular, the object descriptor 300 stores an epoch number 302 for a table space. When, for example, a table space is manipulated so that rows are moved in the table space, the epoch number 302 stored in the object descriptor 300 is updated.

Figure 4:
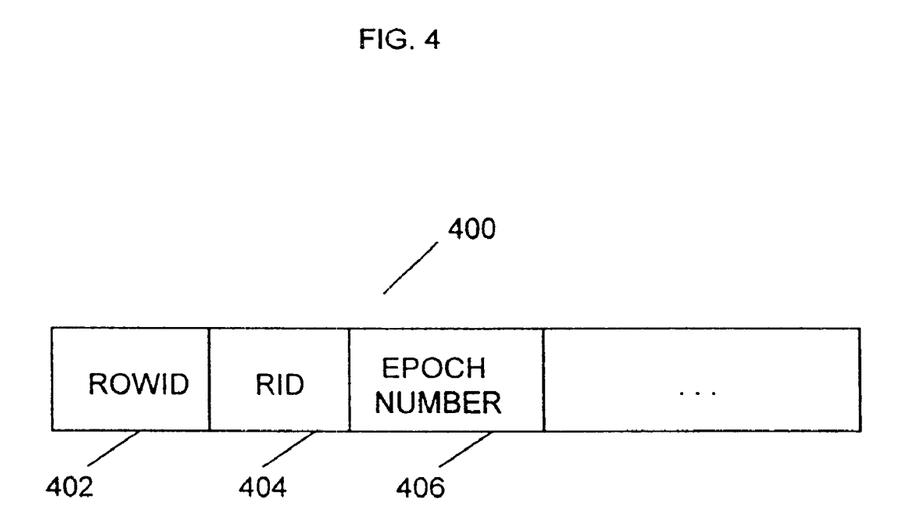
FIG. 4 is a block diagram illustrating an exemplary row.

The row access system 124 works in conjunction with the data manager 118 to access rows in a database. FIG. 4 is a block diagram of an exemplary row 400. When the data manager 118 reads a ROWID 402 from a table, the resulting value includes the RID 404. In particular, the RID 404 is appended to the ROWID 402. The row access system 124 also appends an epoch number 406 to the ROWID 402. The epoch number 406 is obtained from the object descriptor 300 containing the epoch number 302 associated with the table space that the row 400 was read from. For partitioned table spaces, the epoch number 406 is obtained from the object descriptor 300 containing the epoch number 302 associated with the partition that the row 400 was read from.

The row access system 124 uses the epoch number 302 to record row movement. Whenever a data operation is performed that can move rows, the epoch number 302 stored in the object descriptor 300 is incremented. When the data manager 118 updates a row 400 not in place (or an overflow row), the base record for the row does not change. Thus, the RID 404 for the row remains unchanged. Therefore, the row access system 124 does not need to increment the epoch number 302 for the table space or partition in this instance. The epoch number 302 is stored within an object descriptor (i.e., catalog row) that describes the page sets. The DBMS (e.g., DB2 UDB for OS/390) also stores this epoch number 302 within the header page of the pageset or partition for optimization. A common operation that increments the epoch number is the REORG utility. In another embodiment of the invention, update operations may move rows as well, in which case, the concepts of this invention apply to the update operations. The ellipses in FIG. 4 indicate that other information is stored in the row.

Figure 5:
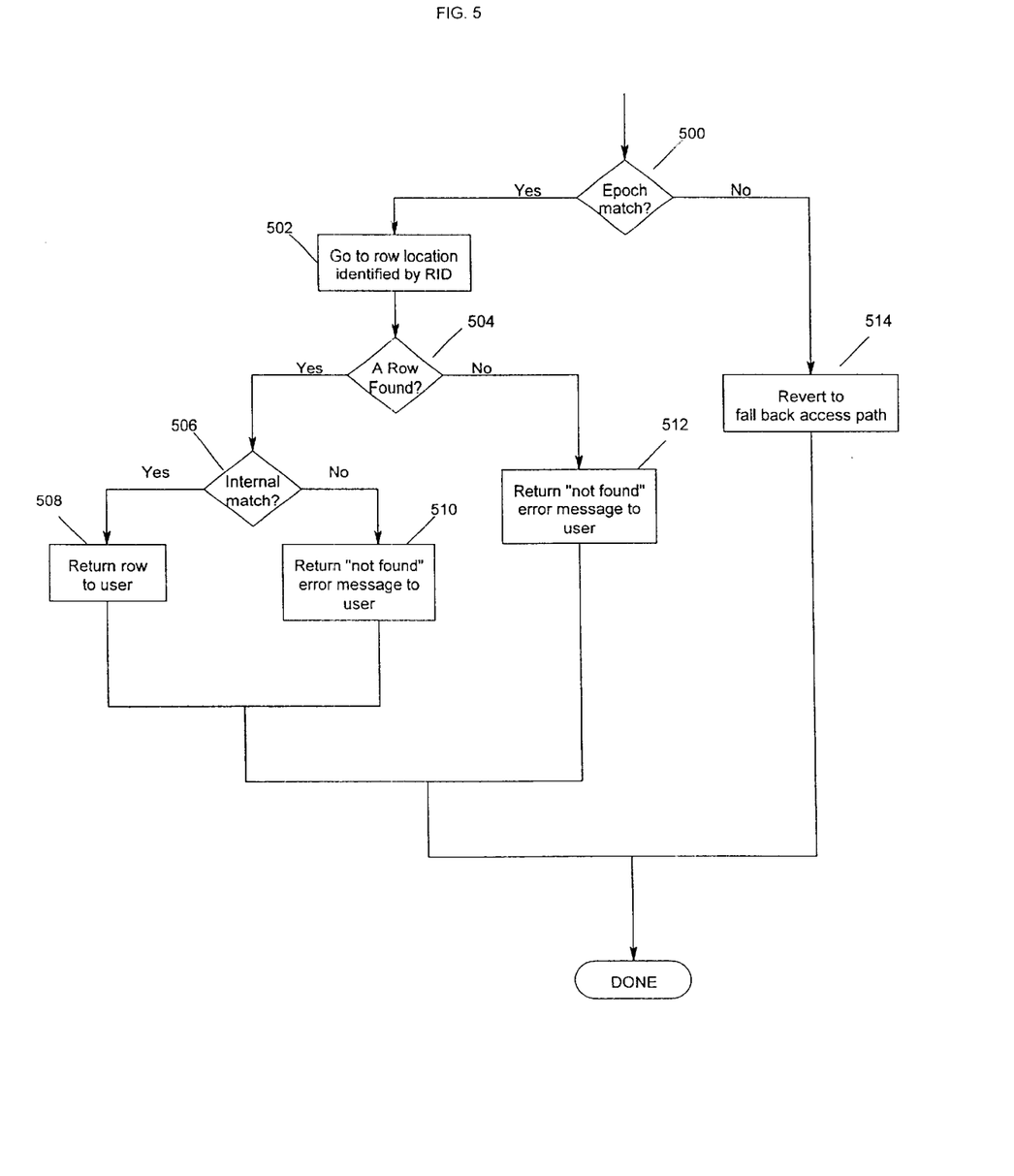
FIG. 5 is a flowchart illustrating steps performed by the row access system in accordance with the present invention.

FIG. 5 is a flow diagram illustrating the steps performed by the row access system 124 when an application performs a data operation (e.g., SELECT, UPDATE, and DELETE) using a row identifier 402 in the predicate. The row identifier 402 has the epoch number 406 appended to it. Therefore, when the data operation uses the row identifier 402, the row access system 124 compares the epoch number 406 appended to the row identifier 402 with the epoch number 302 of the table space or partition identified by the RID 404 to determine whether rows have moved. This determination then is used by the row access system 124 to determine whether to perform direct row access or an alternative access.

In particular, if an application performs a data operation using a row identifier, and the epoch numbers 302 and 406 match, then if the row is found at the appropriate row location and the internal portion of the row identifier matches that stored within the row, then the row access system 124 returns the found row to the user. The internal portion of the row identifier is that portion of the row identifier that is physically stored within the row. The internal portion does not include any of the fields appended to it (e.g., the RID 404 and the epoch number 406).

Moreover, if the epoch numbers 302 and 406 match, and if a row is found at the appropriate row location, and the "internal portion" of the row identifier does not match that stored within the row, then the application is returned a "not found" message. In this case, the row access system 124 recognizes that the original row containing the row identifier value must have been deleted and its RID reused by a subsequent INSERT operation.

Additionally, if the epoch numbers 302 and 406 match, and if no row is found at the appropriate row location, then the row access system 124 recognizes that the original row must have been deleted and returns a "not found" message.

On the other hand, if the epoch number 406 appended to the row identifier value does not match the epoch number 302 for the table space or partition, then the row access system 124 recognizes that an alternative access should be performed, rather than a direct row access.

Block 500 is a decision block that represents the row access system 124 determining whether the epoch number 406 in the predicate matches the epoch number 302 for the table space or partition. If a match exists, the row access system 124 proceeds to block 502. Otherwise, the row access system 124 proceeds to block 514.

Block 502 represents the row access system 124 going to the row location identified by the RID 404. Block 504 is decision block that represents the row access system 124 determining whether a row was found at the location identified by the RID 404. If a row was found, the row access system 124 proceeds to block 506. Otherwise, the row access system 124 proceeds to block 512.

Block 506 is a decision block that represents the row access system 124 determining whether the row identifier 402 in the predicate matches the row identifier 402 in the table space. In particular, the row access system 124 checks whether the internal portion of the row identifier 402 in the predicate matches the internal portion of the row identifier 402 stored in the row within the table space. If there is a match, then the row access system 124 proceeds to block 508. Otherwise, the row access system 124 proceeds to block 510.

Block 508 represents the row access system 124 returning the row to the user. If no match exists, then the row access system 124 returns a "not found" message to the user, as represented by block 510. The "not found" message in this case represents the row access system 124 determining that the original row 400 containing the row identifier 402 was deleted and its RID 404 was reused by a subsequent INSERT operation.

If no row was found at the appropriate row location, the row access system 124 proceeds to block 512. Block 512 represents the row access system 124 returning a "not found" message to the user. The "not found" message in this case represents the row access system 124 determining that the original row 400 was deleted.

The row access system 124 proceeds to block 514 if the epoch number 406 in the predicate does not match the epoch number 302 in the table space. Block 514 represents the row access system 124 working in conjunction with the data manager 118 to either use a table space scan, an index scan, or an index lookup. In this case, the DBMS treats the row identifier 402 predicate as it treats predicates for other types of columns. The only difference is that the DBMS first discards the appended portions of the row identifier 402 (i.e., RID 404 and the epoch number 406) so that comparisons against stored rows only use the internal portion of the row identifier 402.

Because the epoch number 302 is stored within the object descriptor 300, the epoch number 302 persists even if the table space itself is lost. Some DBMSs (e.g, DB2) use a 16 bit integer value for the epoch number. However, this integer may vary in size. A 16 bit integer value prevents the epoch number from wrapping. For example, a 16 bit integer value will only wrap after 655336 database reorganizations are performed. If wrapping is a concern, a larger epoch number could be used. In an alternative embodiment of the invention, a time stamp based approach could be used to generate the epoch number. The 16 bit integer value represents a tradeoff between space usage and possible wrapping.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of accessing a row in a database, wherein the database is stored on a data storage device connected to a computer, the method comprises:
    generating an identification number for a region, wherein the identification number associated with the region reflects row movement in the region;
    updating the identification number when there is row movement in the region; and
    when accessing a row in the region, determining whether to perform a direct row access based on the identification number.

2. The method of claim 1, wherein the region is a table space that is partitioned and wherein the identification number is generated for the partition and wherein the identification number is used to determine whether to perform a direct row access when accessing a row in the partition.

3. The method of claim 1, the method further comprises, when a row is accessed, appending the identification number to a row identifier associated with the accessed row.

4. The method of claim 1, the method further comprises, prior to determining whether to perform the direct row access, receiving a request to access the row in the region in response to a data operation that provides a row identifier to locate the row in the region.

5. The method of claim 4, wherein the data operation provides an identification number associated with the row identifier.

6. The method of claim 5, wherein determining whether to perform a direct row access further comprises comparing the identification number associated with the row identifier with the identification number associated with the table space.

7. The method of claim 6, wherein the identification number associated with the row identifier matches the identification number associated with the table space, the method further comprises performing a direct row access.

8. The method of claim 6, wherein the identification number associated with the row identifier does not match the identification number associated with the table space, the method further comprises performing an alternative access.

9. An apparatus for accessing a row in a database, comprising:
    a computer having a data storage device connected thereto, wherein the data storage device stores a database;
    one or more computer programs, performed by the computer, for generating an identification number for a table space, wherein the identification number associated with the table space reflects row movement in the table space, updating the identification number when there is row movement in the table space, and, when accessing a row in the table space, determining whether to perform a direct row access based on the identification number.

10. The apparatus of claim 9, wherein the region is a table space that is partitioned and wherein the identification number is generated for the partition and wherein the identification number is used to determine whether to perform a direct row access when accessing a row in the partition.

11. The apparatus of claim 9, further comprising means for, when a row is accessed, appending the identification number to a row identifier associated with the accessed row.

12. The apparatus of claim 9, wherein, prior to the means for determining whether to perform the direct row access further comprising the means for receiving a request to access the row in the region in response to a data operation that provides a row identifier to locate the row in the region.

13. The apparatus of claim 12, wherein the data operation provides an identification number associated with the row identifier.

14. The apparatus of claim 13, wherein the means for determining whether to perform a direct row access further comprises the means for comparing the identification number associated with the row identifier with the identification number associated with the region.

15. The apparatus of claim 13, wherein one or more computer programs that determine whether to perform a direct row access further comprise one or more computer programs that compare the identification number associated with the row identifier with the identification number associated with the region.

16. The apparatus of claim 14, wherein the identification number associated with the row identifier matches the identification number associated with the region, further comprising the means for performing a direct row access.

17. The apparatus of claim 14, wherein the identification number associated with the row identifier does not match the identification number associated with the region, further comprising the means for performing an alternative access.

18. The apparatus of claim 14, wherein the identification number associated with the row identifier matches the identification number associated with the region, further comprising one or more computer programs that perform a direct row access.

19. The apparatus of claim 14, wherein the identification number associated with the row identifier does not match the identification number associated with the region, further comprising one or more computer programs that perform an alternative access.

20. The apparatus of claim 9, further comprising one or more computer programs that, when a row is accessed, append the identification number to a row identifier associated with the accessed row.

21. The apparatus of claim 9, wherein, prior to the one or more computer programs determining whether to perform the direct row access, further comprising one or more computer programs that receive a request to access the row in the region in response to a data operation that provides a row identifier to locate the row in the region.

22. An article of manufacture comprising a computer program carrier readable by a computer and embodying one or more instructions executable by the computer to perform a method for accessing a row in a database stored in a data storage device connected to the computer, the method comprises:

generating an identification number for a region, wherein the identification number associated with the region reflects row movement in the region;

updating the identification number when there is row movement in the region; and when accessing a row in the region, determining whether to perform a direct row access based on the identification number.

23. The article of manufacture of claim 22, wherein the region is a table space that is partitioned and wherein the identification number is generated for the partition and wherein the identification number is used to determine whether to perform a direct row access when accessing a row in the partition.

24. The article of manufacture of claim 22, the method further comprises, when a row is accessed, appending the identification number to a row identifier associated with the accessed row.

25. The article of manufacture of claim 22, the method further comprises, prior to determining whether to perform the direct row access, receiving a request to access the row in the region in response to a data operation that provides a row identifier to locate the row in the region.

26. The article of manufacture of claim 25, wherein the data operation provides an identification number associated with the row identifier.

27. The article of manufacture of claim 26, wherein determining whether to perform a direct row access further comprises comparing the identification number associated with the row identifier with the identification number associated with the region.

28. The article of manufacture of claim 27, wherein the identification number associated with the row identifier matches the identification number associated with the region, the method further comprises performing a direct row access.

29. The article of manufacture of claim 27, wherein the identification number associated with the row identifier does not match the identification number associated with the region, the method further comprises performing an alternative access.

* * * * *